United States Patent
Yin et al.

(10) Patent No.: US 12,526,090 B2
(45) Date of Patent: Jan. 13, 2026

(54) HARQ TRANSMISSION ENHANCEMENT METHOD, COMMUNICATION DEVICE, AND READABLE STORAGE MEDIUM

(71) Applicant: JRD COMMUNICATION (SHENZHEN) LTD., Guangdong (CN)

(72) Inventors: Xiaoxue Yin, Guangdong (CN); Jia Sheng, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 327 days.

(21) Appl. No.: 18/260,341

(22) PCT Filed: Jan. 5, 2021

(86) PCT No.: PCT/CN2021/070340
§ 371 (c)(1),
(2) Date: Jul. 5, 2023

(87) PCT Pub. No.: WO2022/147660
PCT Pub. Date: Jul. 14, 2022

(65) Prior Publication Data
US 2024/0056231 A1    Feb. 15, 2024

(51) Int. Cl.
*H04L 1/1829* (2023.01)
*H04W 72/11* (2023.01)

(52) U.S. Cl.
CPC .......... *H04L 1/1854* (2013.01); *H04W 72/11* (2023.01)

(58) Field of Classification Search
CPC ... H04L 1/1854; H04L 1/1607; H04L 1/1812; H04L 1/1861; H04L 1/1896; H04W 72/11; H04W 72/232; H04W 74/0841; H04W 24/08; H04W 72/042; H04W 72/0446; H04W 72/0453; H04W 72/23; H04W 74/0808; H04W 74/0833; H04W 74/0866; H04W 74/006
See application file for complete search history.

(56) References Cited

U.S. PATENT DOCUMENTS

| | | | | |
|---|---|---|---|---|
| 2020/0007298 A1* | 1/2020 | Korhonen | ............. | H04L 5/0055 |
| 2020/0045721 A1* | 2/2020 | Lunttila | ................... | H04L 1/00 |
| 2021/0050950 A1* | 2/2021 | Zhou | ..................... | H04L 1/1812 |
| 2022/0377813 A1* | 11/2022 | Wang | ................... | H04L 1/1861 |

FOREIGN PATENT DOCUMENTS

| | | |
|---|---|---|
| CN | 111226409 A | 6/2020 |
| CN | 111262670 A | 6/2020 |

OTHER PUBLICATIONS

WO_2018142287_A1 (Year: 2018).*
(Continued)

*Primary Examiner* — Rushil P. Sampat
(74) *Attorney, Agent, or Firm* — PV IP PC; Wei Te Chung

(57) ABSTRACT

A hybrid automatic repeat request (HARQ) transmission enhancement method includes receiving a downlink transmission sent by a base station, when an abnormal process is needed in sending of a HARQ feedback signal for the downlink transmission, determining whether the HARQ feedback signal satisfies a condition for postponing feedback, and if yes, selecting a physical uplink shared channel (PUSCH) after an originally scheduled sending time unit of the HARQ feedback signal to transmit at least part of the HARQ feedback signal.

15 Claims, 10 Drawing Sheets

(56) References Cited

OTHER PUBLICATIONS

WO_2021060958_A1 (Year: 2021).*
International Search Report in International application No. PCT/CN2021/070340,mailed on Jun. 29, 2021.
Written Opinion of the International Search Authority in International application No. PCT/CN2021/070340,mailed on Jun. 29, 2021.
VIVO. "HARQ-ACK Enhancements for Rel-17 URLLC" 3GPP TSG RAN WG1#103-e R1-2007655, Nov. 1, 2020 ()Nov. 1, 2020), p. 1-7.
NTT DOCOMO, Inc. "Discussion on HARQ-ACK Feedback Enhancements for Rel. 17 URLLC" 3GPP TSG RAN WG1#103-e R1-2009182, Nov. 1, 2020(Nov. 1, 2020), p. 1-7.
European Search Report in European application No. 21916718.6, mailed on Sep. 2, 2024.
"Clarification for processingCATT :orderof UL multiplexing and cancellation"3GPP Draft:R1-2002060 , 3rdpartnership Project (3GPP), Mobilecompetence Centre;650 , Route Deslucioles :F-06921 Sophia-Antipoliscedex;France.
"Remaining issuesonintra-Uprioritization" , 3GPP Draft;R1-2005675 , 3rdeepartnership Project(3GPP) Mobilecompetence Centre:650Routedelucioles :F-06921 Sophia-Antipoliscedexfrance.
"Discussion on HARtimingforDSPS and multi-slot scheduling"3GPP Draft:R1-1802044 , 3rdpartnership Project(3GPP)Mobilecompetence Centre;650Route Deslucioles :F-06921LI;France.

* cited by examiner

HARQ TRANSMISSION ENHANCEMENT METHOD, COMMUNICATION DEVICE, AND READABLE STORAGE MEDIUM

CROSS REFERENCE TO RELATED APPLICATIONS

This application is a US national phase application based upon an International Application No. PCT/CN2021/070340, filed on Jan. 5, 2021, and entitled "HARQ TRANSMISSION ENHANCEMENT METHOD, COMMUNICATION DEVICE, AND READABLE STORAGE MEDIUM". The entire disclosures of the above application are incorporated herein by reference.

TECHNICAL FIELD

The present application relates to a wireless communication network, in particular to a HARQ transmission enhancement method, a communication device, and a readable storage medium.

BACKGROUND

With the development of communication and the improvement of people's living standards, people's dependence and requirements on mobile communication are getting higher and higher.

The fifth generation mobile communication system (5G NR) includes three major application scenarios, namely enhanced mobile broadband (eMBB), massive machine type communication (mMTC), and ultra-reliable low-latency communication (URLLC).

The feedback enhancement technology related to hybrid automatic repeat request acknowledgment (HARQ-ACK) is one of the work items (WIs) of 3GPP Release 17. The main reason is to solve conflicts between SPS (Semi persistent Scheduling) PDSCH (Physical Downlink Shared Channel) and TDD (Time Division Duplex) configuration in the fifth-generation mobile communication system.

If a user equipment (UE) is configured to transmit SPS PDSCH on slot n, then the UE transmits a HARQ feedback corresponding to the SPS PDSCH through a physical uplink control channel (PUCCH) in slot n+k1, wherein k1 represents a certain number of slots, k1 is configured by PDSCH-to-HARQ_feedback timing indicator field in a downlink control information (DCI) format, or configured by a parameter dl-DataToUL-ACK in a radio resource control (RRC) (an RRC parameter in DCI Format1_2 is dl-DataToUL-ACKForDCIFormat1_2). Because SPS PDSCH is based on semi persistent scheduling, the configuration of k1 is only configured in the DCI format of the start (activate) SPS PDSCH, and the remaining SPS PDSCHs follow the configuration in the activate DCI format for HARQ feedback. That is, for each SPS PDSCH, their k1 values are the same. Based on this characteristic, in a TDD scenario, there may be conflicts. If the HARQ-ACK feedback in response to the SPS PDSCH happens to fall into a non-uplink slot or a non-uplink symbol of TDD, according to the current 3GPP protocol, the HARQ feedback may be discarded to cause performance loss. As shown in FIG. 1, assuming that the TDD slots are configured as 'DDDUU', and the DCI format of the activated (activate) SPS PDSCH indicates k1=2, the position of the HARQ feedback is shown in FIG. 1. The SPS PDSCH sent on DL #1 needs to send corresponding HARQ feedback at the position of DL #3 based on k1=2, but since DL #3 is a downlink slot, the HARQ feedback needs to be discarded. The SPS PDSCH sent at the positions of DL #2 and DL #3 sends the corresponding HARQ feedback at the positions of UL #1 and UL #2 respectively after the calculation of k1=2. Because UL #1 and UL #2 are uplink, HARQ feedback is normally sent to the base station.

SUMMARY OF INVENTION

In order to solve the above problems, the present application provides a HARQ transmission enhancement method, comprising: receiving a downlink transmission sent by a base station;
  when sending of a HARQ feedback signal for the downlink transmission is abnormal, determining whether the HARQ feedback signal satisfies a condition for postponing feedback; and
  if yes, selecting an uplink channel after an originally scheduled sending time unit of the HARQ feedback signal to transmit at least a part of the HARQ feedback signal.

Preferably, the uplink channel is a physical uplink control channel (PUCCH) or a physical uplink shared channel (PUSCH).

Preferably, a physical downlink shared channel (PDSCH) based on a semi-persistent scheduling (SPS) carries the downlink transmission.

Preferably, before determining whether the HARQ feedback signal satisfies a condition for postponing feedback, the method further comprises:
  receiving an enabling indication of a postponing HARQ feedback from the base station.

Preferably, the enabling indication of the postponing HARQ feedback is included in a radio resource control (RRC) signaling or a downlink control information (DCI).

Preferably, the condition for postponing feedback comprises:
  an aggregation factor corresponding to the downlink transmission is greater than a first threshold.

Preferably, the condition for postponing feedback comprises:
  an aggregation factor corresponding to the downlink transmission is less than a second threshold.

Preferably, if the HARQ feedback signal does not satisfy the condition for postponing feedback, abandon sending the HARQ feedback signal.

Preferably, determining whether the HARQ feedback signal satisfies the condition for postponing feedback comprises:
  selecting a first PUCCH after an originally scheduled time unit of the HARQ feedback signal, and determining whether a PUCCH additionally carries the HARQ feedback signal;
  if yes, using the PUCCH to additionally carry the HARQ feedback signal for transmission, if not, discarding the HARQ feedback signal.

Preferably, a formula for determining whether the PUCCH additionally carries the HARQ feedback signal is as follows:

$$O_{ACK\text{-}post} \leq O_{PUCCH\text{-}rem}, O_{PUCCH\text{-}rem} \neq 0,$$

$$O_{PUCCH\text{-}rem} = M - O_{UCI\text{-}or},$$

wherein, $O_{ACK\text{-}post}$ represents a total number of bits occupied by the HARQ feedback signal, $O_{PUCCH\text{-}rem}$ represents a number of vacant bits that the PUCCH is used to transmit the HARQ feedback signal, M represents a total number of bits configured by the PUCCH, and $O_{UCI\text{-}or}$ represents a number of bits occupied by a downlink control information (UCI) originally transmitted by the PUCCH.

Preferably, a calculation formula of M is as follows:

$$M = M_{RB}^{PUCCH} \cdot N_{sc,ctrl}^{RB} \cdot N_{symb\text{-}UCI}^{PUCCH} \cdot Q_m \cdot r,$$

wherein $M_{RB}^{PUCCH}$ is a number of physical resource blocks (PRBs) configured for the PUCCH;

$N_{sc,ctrl}^{RB}$ is a number of subcarriers in each resource block (RB) configured for the PUCCH;

$Q_m$ is a modulation order used by the PUCCH;

r is a maximum code rate.

Preferably, before discarding the HARQ feedback signal, the method further comprises:
  detecting an uplink control information (UCI) data transmitted on the PUCCH, and calculating a number of bits preempted in the UCI data according to a preset UCI preemption rule;
  determining whether the number of preemptable bits satisfies additional carrying of the HARQ feedback signal, if yes, a field corresponding to the number of preemptible bits is used to carry the HARQ feedback signal, and if not, discarding the HARQ feedback signal.

Preferably, determining whether the HARQ feedback signal satisfies the condition for postponing feedback further comprises:
  selecting a first PUCCH after an originally scheduled time unit of the HARQ feedback signal, and determining whether a PUCCH additionally carries a transmission of the HARQ feedback signal;
  if yes, using the PUCCH to additionally carry the HARQ feedback signal;
  if not, skipping the PUCCH, and selecting a second PUCCH that satisfies a carrying condition from a plurality of PUCCHs included in a preset feedback window to additionally carry and transmit the HARQ feedback signal.

Preferably, after selecting the second PUCCH that satisfies the carrying condition, the method further comprises:
  if there is no second PUCCH satisfying the carrying condition, determining whether a cumulative value of free resources of any plurality of PUCCHs in the feedback window satisfies a need to additionally carry the HARQ feedback signal, and if yes, entering a feedback group transmission operation.

Preferably, after selecting the second PUCCH that satisfies the carrying condition, the method further comprises:
  if there is no second PUCCH satisfying the carrying condition, determining, whether there is any PUCCH in the feedback window that carries part of the HARQ feedback signal, if yes, entering a feedback group transmission operation.

Preferably, the feedback group transmission operation comprises:
  grouping HARQ feedback signals according to preset service attributes to obtain a plurality of feedback groups;
  selecting the feedback groups in sequence from high to low according to preset priorities corresponding to the service attributes and configuring the feedback groups with a qualified PUCCH within the feedback window to carry and transmit the qualified PUCCH until a PUCCH selection fails.

Preferably, after the PUCCH selection fails, the method further comprises:
  discarding a current feedback group and a feedback group whose priority order is lower than the current feedback group.

Preferably, determining whether the HARQ feedback signal satisfies the condition for postponing feedback comprises:
  selecting a first PUSCH after an originally scheduled time unit of the HARQ feedback signal, and determining whether a PUSCH additionally carries the HARQ feedback signal;
  if yes, using the PUSCH to additionally carry the HARQ feedback signal for transmission, if not, discarding the HARQ feedback signal.

Preferably, whether the PUSCH additionally carries the HARQ feedback signal comprises:
  determining whether a value of a multiplexing parameter is greater than an amount of information of the HARQ feedback signal according to a preset multiplexing parameter, wherein the multiplexing parameter is configured by the base station in advance;
  if yes, using the PUSCH to carry the HARQ feedback signal for transmission;
  if not, discarding the HARQ feedback signal.

Preferably, determining whether the HARQ feedback signal satisfies the condition for postponing feedback further comprises:
  selecting a first PUSCH after an originally scheduled time unit of the HARQ feedback signal, and determining whether a PUSCH additionally carries a transmission of the HARQ feedback signal;
  if yes, using the PUSCH to additionally carry the HARQ feedback signal;
  if not, skipping the PUSCH, and selecting a second PUSCH that satisfies a carrying condition from a plurality of PUSCHs included in a preset feedback window to additionally carry and transmit the HARQ feedback signal.

Preferably, after selecting the second PUSCH that satisfies the carrying condition, the method further comprises:
  if there is no second PUSCH satisfying the carrying condition, determining whether a cumulative value of free resources of any plurality of PUSCHs in the feedback window satisfies a need to additionally carry the HARQ feedback signal, and if yes, entering a feedback group transmission operation.

Preferably, after selecting the second PUSCH that satisfies the carrying condition, the method further comprises:
  if there is no second PUSCH satisfying the carrying condition, determining, whether there is any PUSCH in the feedback window that carries part of the HARQ feedback signal, if yes, entering a feedback group transmission operation.

Preferably, the feedback group transmission operation comprises:
  grouping HARQ feedback signals according to preset service attributes to obtain a plurality of feedback groups;
  selecting the feedback groups in sequence from high to low according to preset priorities corresponding to the service attributes and configuring the feedback groups with a qualified PUSCH within the feedback window to carry and transmit the qualified PUSCH until a PUSCH selection fails.

Preferably, after the PUSCH selection fails, the method further comprises:

discarding a current feedback group and a feedback group whose priority order is lower than the current feedback group.

The present application further provides a HARQ transmission enhancement method, comprising:

sending an enabling indication of postponing HARQ feedback to a user equipment;

sending a downlink transmission to the user equipment;

if a HARQ feedback signal sent from the user equipment for the downlink transmission is not received in a feedback time unit corresponding to the downlink transmission, trying to use an uplink channel to receive at least a part of the HARQ feedback signal from the user equipment after the feedback time unit.

Preferably, a downlink indication comprises a multiplexing indication comprising a multiplexing parameter, and the multiplexing parameter is used to indicate a number of PUSCH multiplexing bytes allocated to the user equipment.

The present application further provides a communication device, comprising a processor and a communication circuit, wherein the processor is connected to the communication circuit;

wherein the processor is configured to execute instructions to implement the above method.

The present application further provides a communication device, comprising a processor and a communication circuit, wherein the processor is connected to the communication circuit;

wherein the processor is configured to execute instructions to implement the above method.

The present application further provides a readable storage medium storing instructions, wherein the above method is implemented when the instructions are executed.

BRIEF DESCRIPTION OF THE DRAWINGS

In order to illustrate the technical solutions more clearly in the embodiments of the present application, the following briefly introduces the drawings that need to be used in the description of the embodiments. Apparently, the drawings in the following description are only some embodiments of the present application. For those skilled in the art, other drawings can also be obtained based on these drawings without creative effort, wherein.

DETAILED DESCRIPTION OF ILLUSTRATED EMBODIMENTS

The technical solutions in the embodiments of the present application will be clearly and completely described below in conjunction with the drawings in the embodiments of the present application. Apparently, the described embodiments are only some of the embodiments of the present application, rather than all the embodiments. Based on the embodiments in this application, all other embodiments obtained by persons of ordinary skill in the art without making creative efforts belong to the scope of protection of the present application.

A "user device" in the present application may include or represent any portable computing device used for communication. Examples of user equipment that may be used in certain embodiments of the described devices, methods, and systems may be wired or wireless devices. Examples include mobile devices, mobile phones, terminals, smartphones, portable computing devices such as laptops, handhelds, tablets, tablets, netbooks, personal digital assistants, music players, and other computing devices capable of wired or wireless communication.

Figure 1:
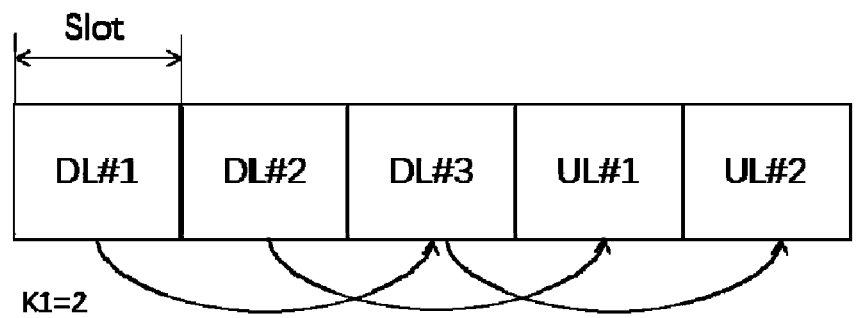
FIG. 1 is a schematic diagram of transmission intervals between SPS PDSCH and HARQ feedback in the prior art.
Figure 2:
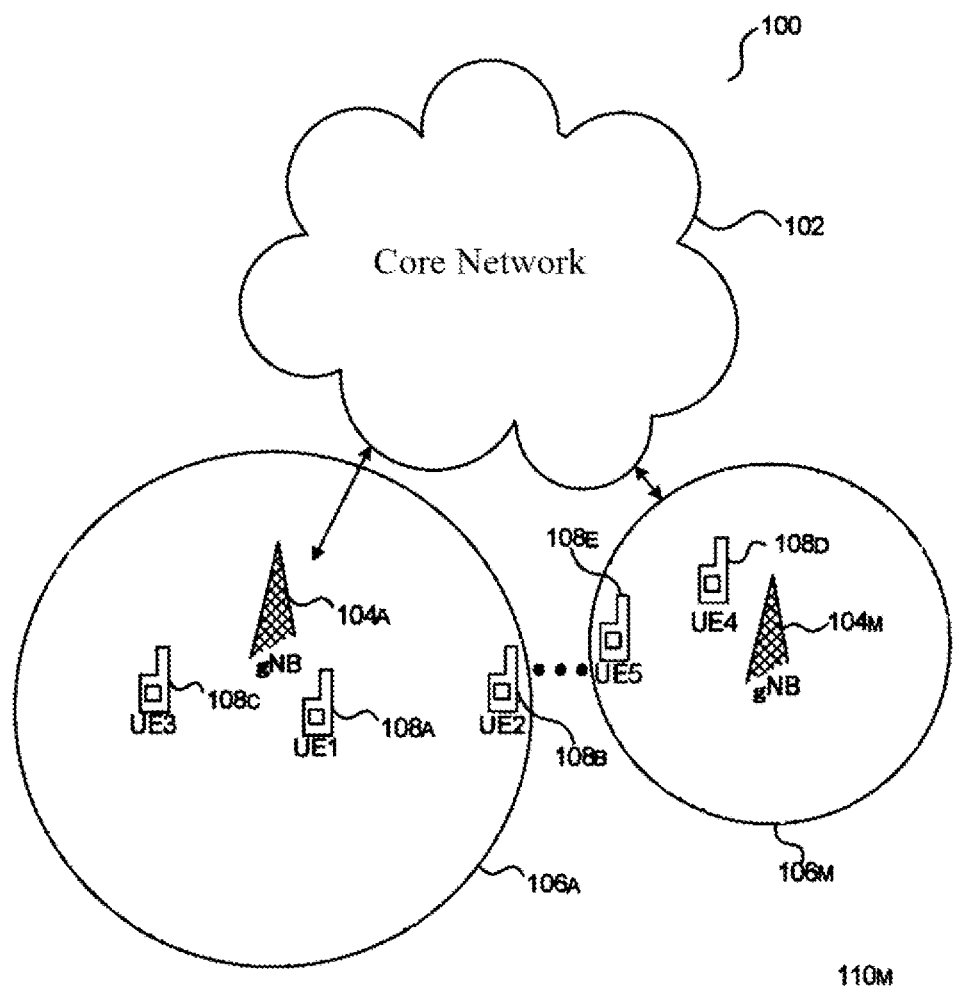
FIG. 2 is a schematic structural diagram of a wireless communication system or network according to an embodiment of the present application.

FIG. 2 is a schematic diagram of a wireless communication system or network 100 including a core network 102 (or telecommunications infrastructure) and a plurality of network nodes 104a-104m (e.g., base stations gNB) of cells 106a-106m serving a plurality of wireless communication units 108a-108e (e.g., UEs). A plurality of network nodes 104a-104m are connected to the core network 102 by links. These links may be wired or wireless (e.g., radio communication links, fiber optics, etc.). The core network 102 may include a plurality of core network nodes, network entities, application servers, or any other network or computing device that may communicate with one or more radio access networks including a plurality of network nodes 104a-104m.

In this example, the network nodes 104a-104m are illustrated as base stations, such as but not limited to, which may be gNBs in a 5G network. Each of the plurality of network nodes 104a-104m (e.g., base stations) has a footprint, for simplicity and by way of example but not limitation, it is schematically represented in FIG. 2 as corresponding circular cells 106a-106m for serving one or more user equipments UE 108a-108e. UEs 108a-108e are capable of receiving services from wireless communication system 100, such as voice, video, audio, or other communication services.

The wireless communication system or network 100 may include or represent any one or more communication networks for communication between UEs 108a-108e and other devices, content sources, or servers connected to the wireless communication system or network 100. The core network 102 may also include or represent one or more communication networks that are linked, coupled, or connected to form the wireless communication system or network 100, one or more network nodes, entities, elements, application servers, servers, base stations, or other network devices. Links or couplings between network nodes may be wired or wireless (e.g., radio communication links, optical fibers, etc.). The wireless communication system or network 100 and the core network 102 may include any suitable combination of a core network and a radio access network comprising network nodes or entities, base stations, access points, etc. to enable communication between UEs 108a-108e, the wireless communication system 100, and network nodes 104a-104m of the core network 102, content sources, and/or other devices connected to the system or network 100.

An example of a wireless communication network 100 that may be used in some embodiments of the described devices, methods, and systems may be at least one communication network or a combination thereof, including, but not limited to, one or more wired and/or wireless telecommunications networks, one or more core networks, one or more wireless access networks, one or more computer networks, one or more data communication networks, Internet, telephone network, wireless network such as WiMAX, WLAN, and/or Wi-Fi networks based on IEEE 802.11 standard as an example only or Internet Protocol (IP) network, packet switched network or enhanced packet switched network, IP Multimedia Subsystem (IMS) network or communication network based on wireless, cellular, or satellite technology such as mobile networks, Global System for Mobile Communications (GSM), GPRS network, Wideband Code Division Multiple Access (W-CDMA), CDMA2000 or LTE/LTE-Advanced communication network, or any 2nd, 3rd, 4th, or 5th generation and beyond type communication network etc.

In the example of FIG. 2, the wireless communication system 100 may be, by way of example only and not limited to, a 5G communication network using cyclic prefix orthogonal frequency division multiplexing (CP-OFDM) technology for downlink and uplink channels. The downlink may include one or more communication channels for transmitting data from one or more gNBs 104a-104m to one or more UEs 108a-108e. Typically, a downlink channel is a communication channel used to transmit data, e.g., from gNB 104a to UE 108a.

Both uplink and downlink for 5G networks are divided into radio frames (for example, each frame can be 10 ms in length), where each frame can be divided into multiple subframes. For example, each frame may include 10 subframes of equal length, wherein each subframe is composed of multiple time slots (for example, 2 time slots) for transmitting data. In addition to slots, a subframe may include several additional special fields or OFDM symbols, which may include, by way of example only, downlink synchronization symbols, broadcast symbols, and/or uplink reference symbols.

The inventors found that a large number of HARQ feedback conflicts or transmission anomalies caused by semi-persistent scheduling in TDD can be avoided by designing a mechanism for postponing transmission of HARQ feedback. Therefore, performance loss is caused, and while the feedback is postponing, the information between the base station and the UE can be kept equal.

Figure 3:
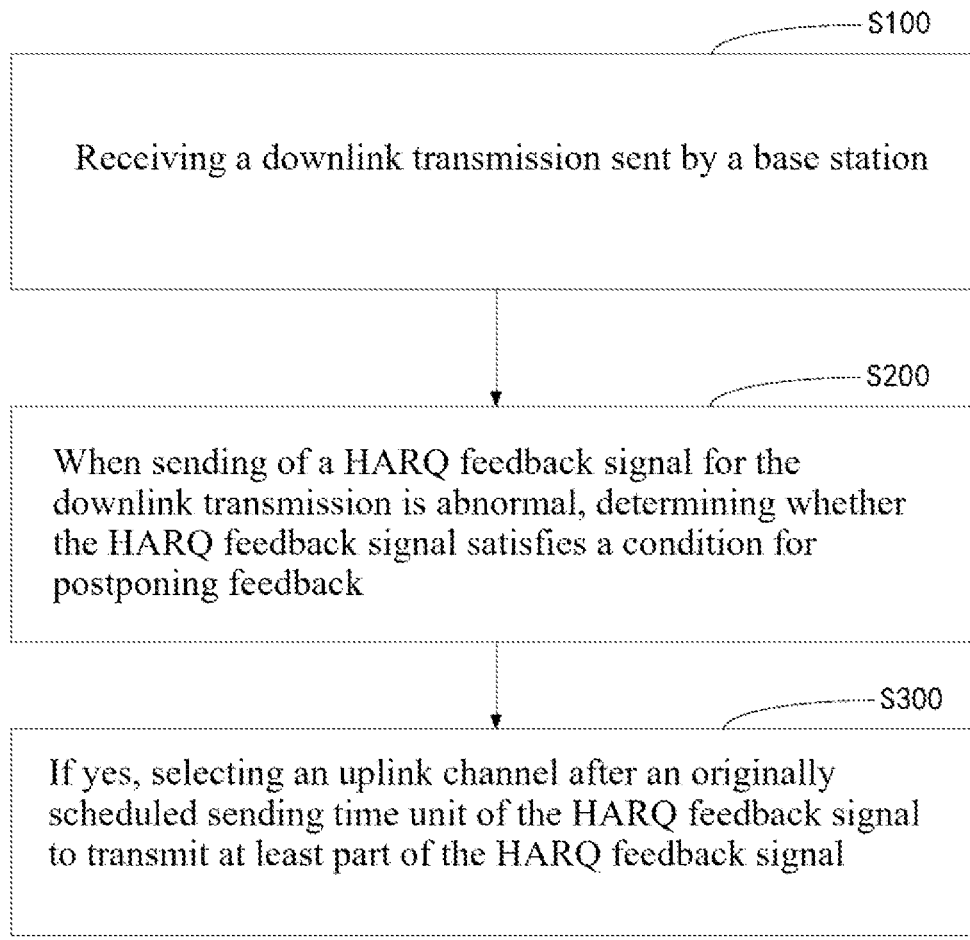
FIG. 3 is a schematic flowchart of a HARQ transmission enhancement method according to a first embodiment of the present application.

As shown in FIG. 3, a first embodiment of the HARQ transmission enhancement method of the present application includes:

Operation S100: Receiving a downlink transmission sent by a base station.

This embodiment is applied to user equipment UE. For ease of description, the user equipment "UE" is used hereinafter to refer to the subject implementing the solutions of the embodiments of the present application.

The UE receives the downlink transmission sent by the base station and sends a HARQ feedback signal to the base station for the downlink transmission, wherein the feedback signal includes a hybrid automatic repeat acknowledgment ACK or a hybrid automatic repeat negative acknowledgment NACK.

Operation S200: When sending of a HARQ feedback signal for the downlink transmission is abnormal, determining whether the HARQ feedback signal satisfies a condition for postponing feedback.

The abnormality includes the situation that the HARQ feedback falls into a downlink slot, which causes a collision or other situations where the HARQ feedback signal is not sent.

When the sending of the HARQ feedback signal for downlink transmission is abnormal, the UE first determines whether the HARQ feedback satisfies the condition for postponing feedback, and then selects to postpone sending the HARQ feedback or discard the HARQ feedback.

If the condition for postponing feedback is not met, then abandon sending the HARQ feedback signal or directly discard the HARQ feedback signal.

The condition for postponing feedback may include whether the base station configures a HARQ enabling indication to the UE, whether the UE determines whether the UE on its own meets the condition for postponing HARQ feedback, and whether there are suitable uplink channel resources for transmitting the postponing HARQ feedback, etc. Various conditions can be superimposed on each other or in a parallel relationship, which is not limited in the present application, and each condition will be described in detail below.

In addition, the uplink channel described herein may also refer to uplink channel resources.

Operation S300: If yes, selecting an uplink channel after an originally scheduled sending time unit of the HARQ feedback signal to transmit at least a part of the HARQ feedback signal.

Time units include slots or other equivalent constituent units of the frame structure. In a conventional scenario, as described in the background, the HARQ feedback sent to the base station corresponding to the downlink transmission has a fixed sending slot. The interval between the downlink transmission receiving slot and the corresponding feedback sending slot is configured in the DCI.

Because the fixed sending slot may not be the uplink slot, the HARQ feedback has conflicted with the originally scheduled sending slot. Therefore, the present application designs to use the slot carrying the uplink channel after the originally scheduled sending slot to send the HARQ feedback. That is, the uplink channel after the original sending time unit of the HARQ feedback signal is selected for transmission.

The uplink channel resources after the original sending slot may not be able to satisfy the transmission of all HARQ feedbacks. Therefore, part or all of the HARQ feedback postponed by transmission depends on the subsequent uplink channel resources of the originally scheduled sending slot.

Through the implementation of this embodiment, in abnormal situations such as HARQ feedback being discarded due to collision or giving up, it is determined whether the HARQ feedback satisfies the condition for postponing feedback, and if yes, at least a part of the HARQ feedback is postponed reducing performance loss.

Optionally, the uplink channel is a physical uplink control channel (PUCCH), a physical uplink shared channel (PUSCH), and other existing uplink channels.

Optionally, a physical downlink shared channel (PDSCH) based on a semi-persistent scheduling (SPS) carries the downlink transmission.

Optionally, before determining whether the HARQ feedback signal satisfies the condition for postponing feedback in operation S200, the method further comprises:

receiving an enabling indication of a postponing HARQ feedback from the base station.

In this embodiment, in order to improve the compatibility with the previous version, an enabling parameter is set to indicate whether to support postponing the sending of HARQ feedback that generates a conflict. Exemplarily, this parameter is defined as postponeHARQ-ACK. When the base station configures the postponing HARQ-ACK for the UE, it indicates that after a collision occurs, the UE can postpone the feedback of the conflicting HARQ-ACK according to the actual situation. When the base station does not configure the postponingHARQ-ACK to the UE, the UE may continue to use the existing mechanism. That is, when a conflict occurs, the conflicting HARQ-ACK is discarded. postponeHARQ-ACK can be configured by DCI or RRC signaling.

Optionally, the condition for postponing feedback described in operation S200 may include:

wherein an aggregation factor corresponding to the downlink transmission is greater than a first threshold or wherein an aggregation factor corresponding to the downlink transmission is less than a second threshold.

Figure 4:
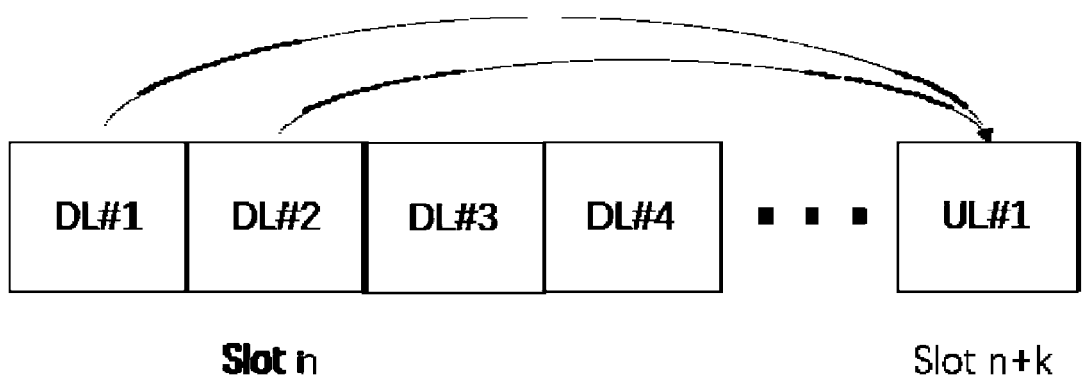
FIG. 4 is a schematic diagram of transmission based on aggregation factors according to a first embodiment of the present application.

Specifically, there is a parameter pdsch-AggregationFactor in the SPS PDSCH configuration (SPS-config). That is, the aggregation factor is used to characterize the number of SPS PDSCH aggregations. For example, if the pdsch-AggregationFactor is 2, it means that two consecutive SPS PDSCHs may be configured on two consecutive slots in each SPS cycle. As shown in FIG. 4 below, if an SPS PDSCH is configured on DL #1, and the parameter pdsch-AggregationFactor is 2, then an SPS PDSCH is also configured on DL #2.

For the above situation, its HARQ-ACK feedback is specified in the current protocol as: The UE feeds back the HARQ-ACK codebook corresponding to the corresponding PDSCH reception at slot n+k. The slot where the PDSCH is located is from slot(n-pdsch-AggregationFactor+1) to slot n. Corresponding to the example in FIG. 4, assuming that UL #1 corresponds to slot n+k, and DL #2 corresponds to slot n, then the HARQ-ACK corresponding to the SPS PDSCH on DL #1 and DL #2 is fed back on slot n+k.

According to the current agreement, the value of pdsch-AggregationFactor is {1,2,4,8}. When the aggregated number of SPS PDSCHs is relatively large, if the HARQ-ACK feedback corresponding to these SPS PDSCHs collides with the TDD configuration and is discarded, it means that a large number of HARQ-ACK feedbacks may be discarded, resulting in performance loss. But on the other hand, if the amount of HARQ-ACK feedback data that conflicts with the TDD slot configuration is relatively large, the load pressure on the PUCCH or PUSCH carrying these HARQ-ACK feedback may be relatively large after the postponing. This leads to unbalanced uplink data transmission load. Considering the above two factors, the application designs two solutions to this:

Solution 1: When pdsch-AggregationFactor is greater than the first threshold, HARQ-ACK feedback is allowed to be postponed.

Solution 2: When pdsch-AggregationFactor is less than the second threshold, HARQ-ACK feedback is allowed to be postponed.

The first threshold and the second threshold are preconfigured thresholds. The threshold can be pre-stored on both sides of the base station and the UE, but the information on both sides is equal. The threshold can also be configured to the UE by the base station side through DCI or RRC parameter. The UE may support one of the Solutions according to factors such as its own UE capability. The UE may also support handover in different application scenarios in both Solutions. The indication of the handover Solution can be configured through DCI format or RRC parameter.

Through the implementation of the above method, it is possible to select the best balance point between the discarding of a large amount of HARQ feedback due to PDSCH aggregation and the postponing in sending the large amount of HARQ feedback, thereby reducing the disadvantages caused by the two.

Due to the probability of misjudgment in UE detection, in view of the consideration of minimizing the self-detection or selection operations on the UE side, thereby ensuring the information synchronization between the base station and the UE side, the design of this application preferably sends the postponing HARQ feedback at a fixed time unit position after the original sending time unit. Multiple options are given below and described in detail:

Solution A: Select the first PUCCH after the collision to transmit the postponing HARQ-ACK feedback.

Solution B: Select the first PUSCH after the collision to transmit the postponing HARQ-ACK feedback.

Solution C: Select the first PUCCH with spare bits to carry the postponing HARQ-ACK feedback after the collision to transmit the postponing HARQ-ACK.

Solution D: Select the first PUSCH with spare bits to carry the postponing HARQ-ACK feedback after the collision to transmit the postponing HARQ-ACK.

It should be noted that the solutions A, B, C, and D can be independent of each other, or can be combined with each other, which is not limited in this application.

Figure 5:
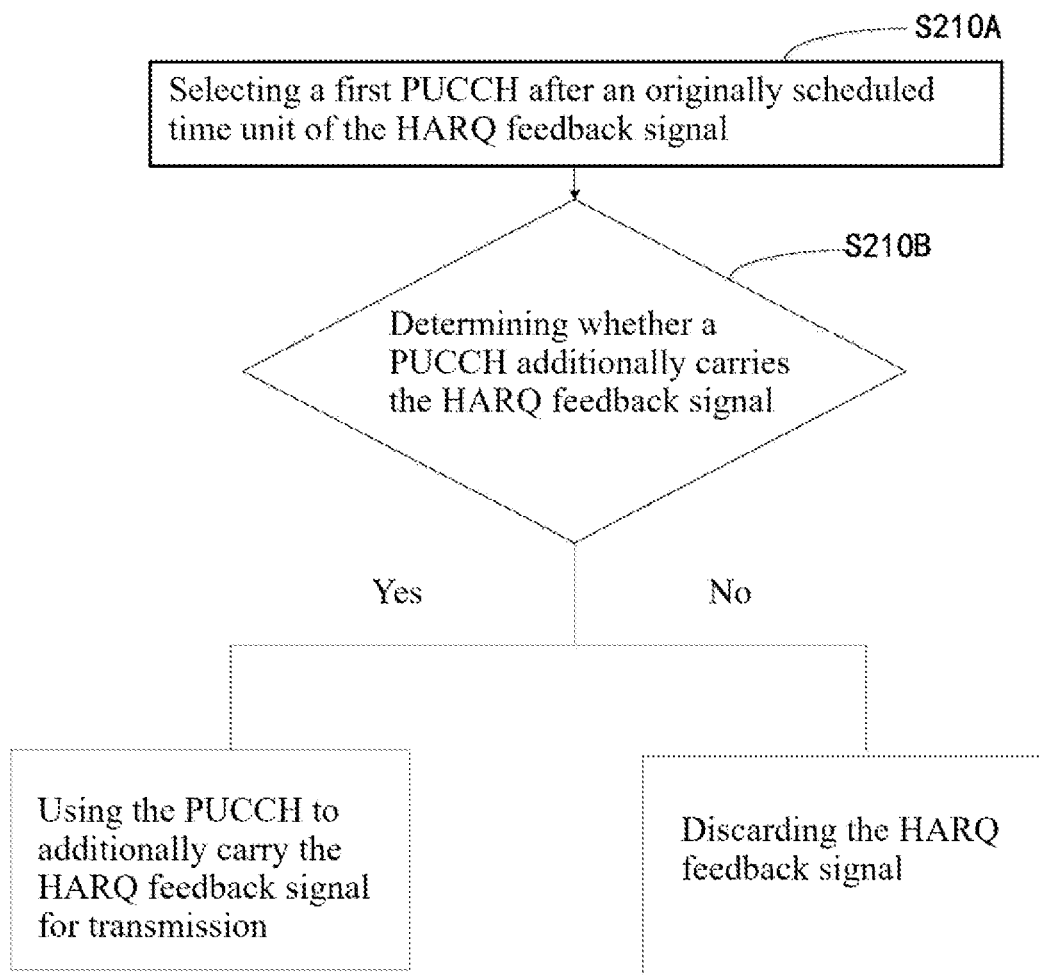
FIG. 5 is a schematic flowchart of operation S200 according to another embodiment of the present application.

Optionally, as shown in FIG. 5, the operation S200 of determining whether the HARQ feedback signal satisfies the condition for postponing feedback comprises:

Operation S210A: Selecting a first PUCCH after an originally scheduled time unit of the HARQ feedback signal.

Operation S210B: Determining whether a PUCCH additionally carries the HARQ feedback signal.

If yes, using the PUCCH to additionally carry the HARQ feedback signal for transmission, if not, discarding the HARQ feedback signal.

Specifically, this embodiment is the implementation of solution A. The UE is preset with a calculation formula, which is used to calculate whether the first PUCCH after the original time unit of the HARQ feedback signal has enough resources to additionally carry the postponing HARQ feedback signal.

If there are not enough resources on the PUCCH, in this embodiment, the HARQ feedback is discarded, so as to ensure the information equality between the base station and the UE side, without increasing the implementation complexity of the base station detecting HARQ feedback and reducing the redundancy of the mechanism.

Optionally, a formula for determining whether the PUCCH additionally carries the HARQ feedback signal in operation S210B is as follows:

$$O_{ACK\text{-}post} \leq O_{PUCCH\text{-}rem}, O_{PUCCH\text{-}rem} \neq 0$$

$$O_{PUCCH\text{-}rem} = M - O_{UCI\text{-}or} \quad \text{(Formula 1)}$$

$O_{ACK}$-post represents a total number of bits occupied by the HARQ feedback signal, $O_{PUCCH}$-rem represents a number of vacant bits that the PUCCH is used to transmit the HARQ feedback signal, M represents a total number of bits configured by the PUCCH, and $O_{UCI\text{-}or}$ represents a number of bits occupied by a downlink control information (UCI) originally transmitted by the PUCCH.

A calculation formula of M is as follows:

$$M = M_{RB}^{PUCCH} \cdot N_{RB}^{PUCCH} \cdot N_{sc,ctrl}^{RB} \cdot N_{symb\text{-}UCI}^{PUCCH} \cdot Q_m \cdot r \quad \text{(Formula 2)}$$

$M_{RB}^{PUCCH}$ is a number of physical resource blocks (PRBs) configured for the PUCCH. When PUCCH format 2 or PUCCH format 3 is configured by parameter nrofPRBs, PUCCH format 4 is 1. If PUCCH format 2 and PUCCH format 3 are both configured, the minimum value of the two nrofPRBs is selected.

$N_{sc,ctrl}^{RB}$ is a number of subcarriers in each resource block (RB) configured for the PUCCH.

$Q_m$ is a modulation order used by the PUCCH.

r is a maximum code rate, configured by the RRC parameter maxCodeRate.

The calculation formula of $O_{UCI\text{-}or}$ is as follows:

$$O_{UCI\text{-}or} = O_{ACK} + O_{SR} + O_{CSI\text{-}part1} + O_{CSI\text{-}part2} \quad \text{(Formula 3)}$$

$O_{ACK}$, $O_{SR}$, $O_{CSI\text{-}part1}$, $O_{CSI\text{-}part2}$ respectively represent the number of bits occupied by HARQ, SR, CSI-part1, and CSI-part2 to be sent in the PUCCH. If not actually sent, the corresponding value is 0.

Figure 6:
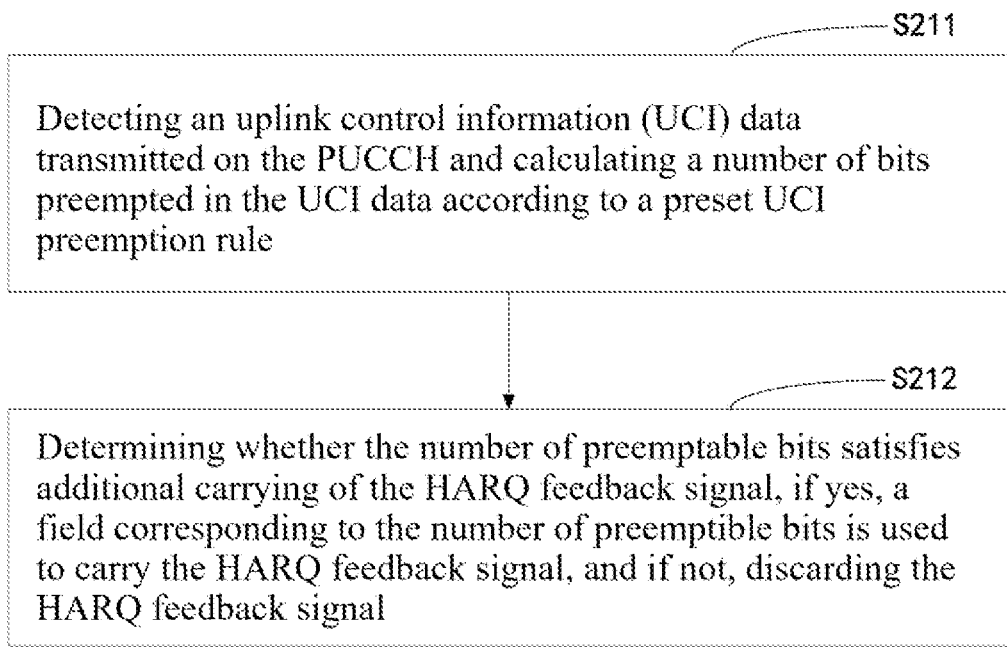
FIG. 6 is a schematic flowchart before operation S210 according to another embodiment of the present application.

Optionally, as shown in FIG. 6, before discarding the HARQ feedback signal in operation S210, he method further comprises:

Operation S211: Detecting an uplink control information (UCI) data transmitted on the PUCCH and calculating a number of bits preempted in the UCI data according to a preset UCI preemption rule.

Operation S212: Determining whether the number of preemptable bits satisfies additional carrying of the HARQ feedback signal, if yes, a field corresponding to the number of preemptible bits is used to carry the HARQ feedback signal, and if not, discarding the HARQ feedback signal.

Specifically, in this embodiment, on the basis of solution A, an additional function of preempting uplink control information UCI may be selected. That is, when the UCI transmitted on the PUCCH used to transmit the postponing HARQ feedback is a low-priority uplink transmission or the base station configures an indication that can be preempted, One or several specific UCI types can be preempted according to the actual situation, and the postponing HARQ feedback can be transmitted preferentially. Assuming that there are N types of UCI, use $O_n$ to represent the number of bits occupied by UCI type n in the PUCCH, where $0 < n \leq N$. The sum of the bits corresponding to the UCI that is allowed to be occupied in the PUCCH is $O_{pre\text{-}empt}$. Which UCI type may be preempted is indicated by the parameter pre-emptInd. This parameter is configured by the base station, can be configured by DCI format, or can be configured by higher layer signaling (for example, RRC), and this parameter is $\lceil \log_2(N) \rceil$bit. Therefore, $O_{pre\text{-}empt} = \sum_{n=1}^{pre\text{-}emptInd+1} O_n$, that is, if the UE is configured with the parameter pre-emptInd, according to this formula, the UE can discard the signaling corresponding to the $O_{pre\text{-}empt}$ bit of the corresponding UCI type. These bits are used to send postponing HARQ feedback, where the specific number of UCI types and the corresponding relationship in $O_n$ can be configured by the base station.

For example, assuming that N=4, the corresponding UCI types and corresponding preempted priorities are: SR, CSI-part2, CSI-part1, and HARQ from high to low. Assuming that pre-emptInd=0 is configured, it means $O_{pre\text{-}empt} = O_{SR}$. That is, the bit originally used to send SR can be preempted to send postponing HARQ feedback. Assuming that pre-emptInd=2 is configured, it means $O_{pre\text{-}empt} = O_{SR} + O_{CSI\text{-}part1} + O_{CSI\text{-}part2}$. That is, the bits originally used to send SR and CSI can be preempted to send postponing HARQ feedback.

Therefore, if the UE is configured with the preemption indication pre-emptInd, the PUCCH can carry the postponing HARQ feedback and send it together when the following conditions are met:

$$O_{ACK\text{-}post} \leq O_{PUCCH\text{-}rem} + O_{pre\text{-}empt}$$

$$O_{PUCCH\text{-}rem} + O_{pre\text{-}empt} \neq 0$$

If the UE is not configured with the preemption indication pre-emptInd, solution A is still used.

Figure 7:
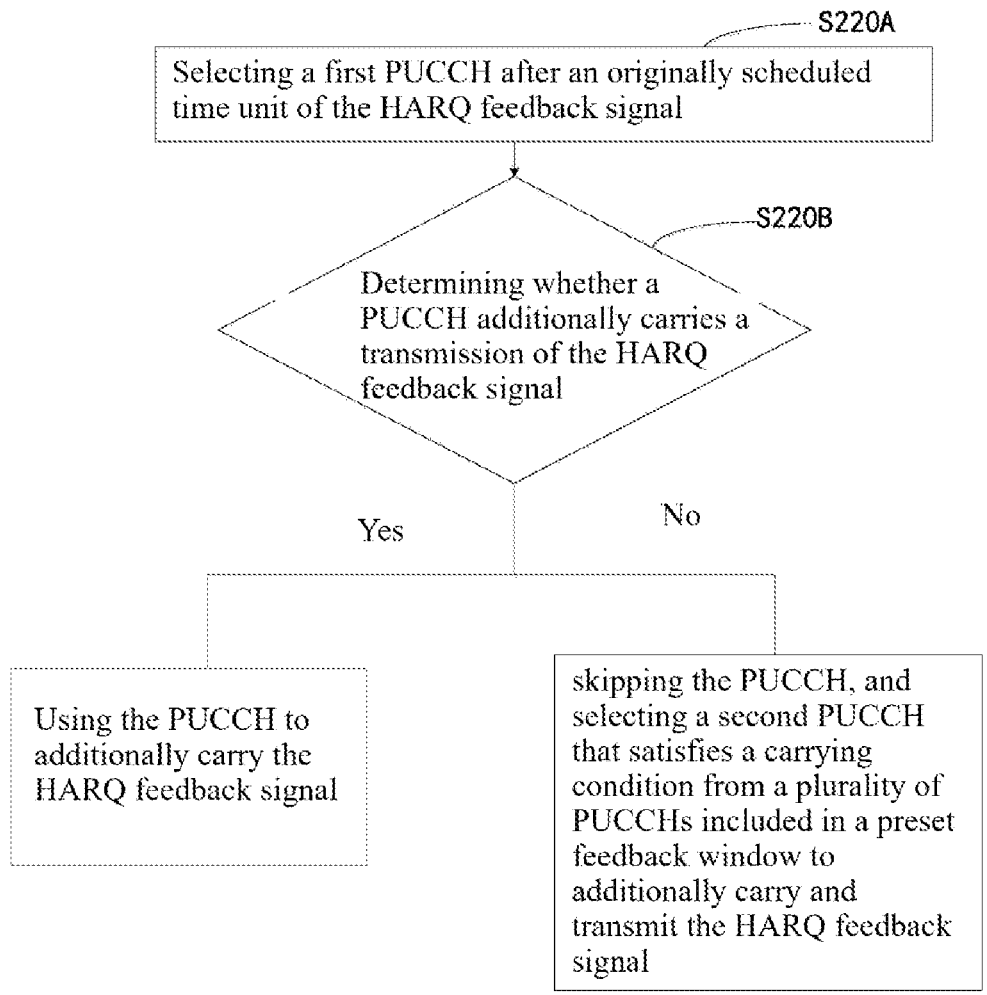
FIG. 7 is a schematic flowchart of operation S200 according to another embodiment of the present application.

Optionally, as shown in FIG. 7, determining whether the HARQ feedback signal satisfies the condition for postponing feedback in operation S200 further includes:

Operation S220A: Selecting a first PUCCH after an originally scheduled time unit of the HARQ feedback signal.

Operation S220B: Determining whether a PUCCH additionally carries a transmission of the HARQ feedback signal.

If yes, using the PUCCH to additionally carry the HARQ feedback signal.

If not, skipping the PUCCH, and selecting a second PUCCH that satisfies a carrying condition from a plurality of PUCCHs included in a preset feedback window to additionally carry and transmit the HARQ feedback signal.

Specifically, this embodiment is solution C. If the first PUCCH after the HARQ feedback originally sending time unit does not meet the requirements of sending postponing HARQ-ACK feedback, then skip this PUCCH and determine whether the next PUCCH meets the requirements, and so on until an available PUCCH is selected. For the determining method of whether the PUCCH meets the requirements, refer to formula 1-3. The solution of this embodiment also adds a termination mechanism to avoid endless delay due to the need to select a PUCCH that meets the requirements. If the downlink transmission is URLLC service, the corresponding HARQ feedback postponing is too much and does not meet the low delay requirement of URLLC service.

Therefore, two solutions, direct configuration and indirect configuration, can be used for the termination condition of the selection mechanism. Direct configuration means that a higher layer or DCI directly configures a feedback window to the UE. The UE searches for an applicable PUCCH within the feedback window. If there is no eligible PUCCH within the feedback window, the conflicting HARQ feedback is discarded. Indirect configuration refers to the maximum value (k1_max) of k1 configured according to the higher layer (dl-DataToUL-ACK or dl-DataToUL-ACKForDCI-Format1_2) as the boundary of the feedback window. If the postponing HARQ feedback is only 1 bit, the feedback window is counted from slot n where the corresponding SPS PDSCH is located to slot n+k1_max. If the postponing HARQ feedback is multiple bits, select the slot n where the last (latest) SPS PDSCH of their corresponding SPS PDSCHs is located as the starting point of the feedback window. slot n+k1_max is the end point of the feedback window.

The implementation of this embodiment can select the subsequent PUCCH or the PUCCH in the configured feedback window to transmit the HARQ feedback when the first PUCCH does not meet the requirements for postponing the sending of the HARQ feedback. It further enhances the HARQ transmission, and thus reduces the discarded HARQ feedback.

Figure 8:
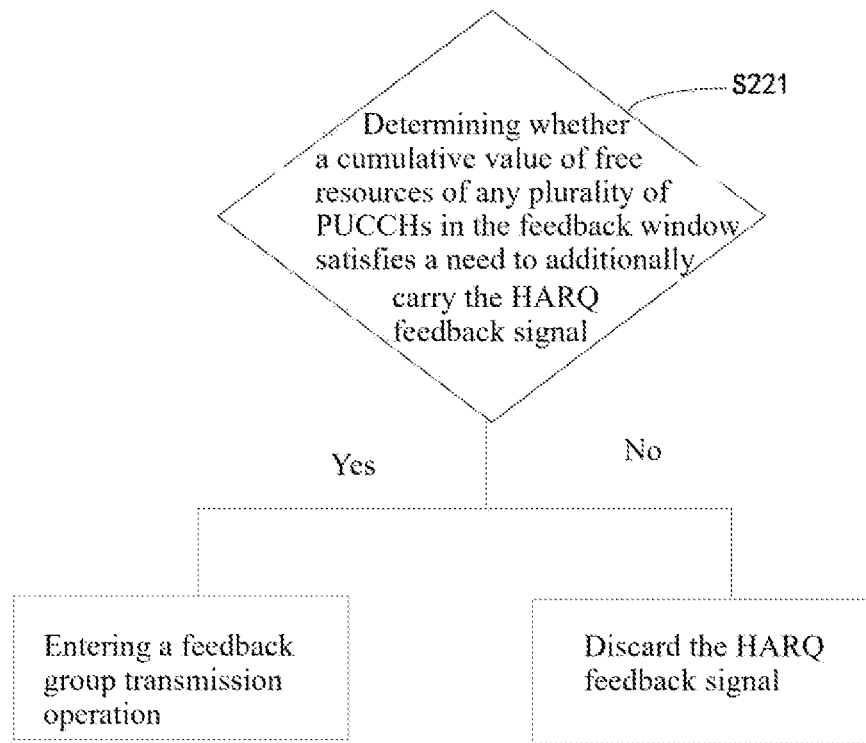
FIG. 8 is a schematic flowchart after operation S220 according to another embodiment of the present application.

Optionally, as shown in FIG. 8, after selecting the second PUCCH that satisfies the carrying condition in operation S220, the method further comprises:

Operation S221: If there is no second PUCCH satisfying the carrying condition, determining whether a cumulative value of free resources of any plurality of PUCCHs in the feedback window satisfies a need to additionally carry the HARQ feedback signal, and if yes, entering a feedback group transmission operation.

This embodiment is an extension of solution C. Continuing to solution C, if there is no PUCCH that satisfies the carrying condition in the feedback window, but there is a PUCCH that can transmit partially postponing HARQ feedback or the remaining resources of multiple PUCCHs can be accumulated together to transmit all postponing HARQ feedback, then the solution of this embodiment can be used. That is, the postponing HARQ-ACK feedback group is allowed to enter the feedback group transmission operation. The grouped HARQ feedback is respectively transmitted through multiple PUCCHs within the feedback window.

Figure 9:
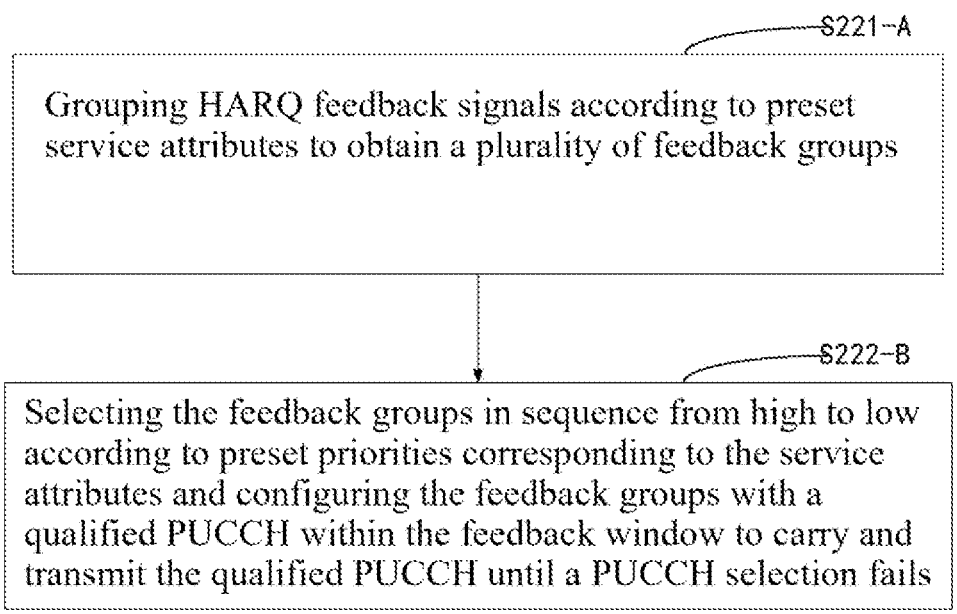
FIG. 9 is a schematic flowchart of operation S221 according to another embodiment of the present application.

Optionally, as shown in FIG. 9, the feedback group transmission operation in operation S221 includes:

Operation S221-A: Grouping HARQ feedback signals according to preset service attributes to obtain a plurality of feedback groups.

Operation S221-B: Selecting the feedback groups in sequence from high to low according to preset priorities corresponding to the service attributes and configuring the feedback groups with a qualified PUCCH within the feedback window to carry and transmit the qualified PUCCH until a PUCCH selection fails.

Specifically, the postponing HARQ-ACK feedback is first grouped according to priority. For example, the URLLC service field has a high priority, and the enhanced mobile broadband eMBB service field has a low priority, thereby obtaining multiple feedback groups.

Send high-priority feedback groups first, that is, first determine whether there is a qualified PUCCH to send high-priority groups and refer to formula 1-3 for the determining method. After the high-priority group determines the PUCCH for transmission, it is determined whether there is a PUCCH that meets the requirements to send the low-priority group, and if not, discard the HARQ of the group, or directly discard the group and the groups with lower priority than the group.

It should be noted that the sending time of the PUCCH of the low-priority group is not earlier than that of the PUCCH of the high-priority group.

The solution implemented in this embodiment makes it possible to reduce the HARQ discarding rate by using the design of grouping HARQ feedback and transmitting them through multiple PUCCHs in the feedback window, even if most PUCCHs in the feedback window do not satisfy the carrying capacity and postpone the HARQ feedback. Thus, the HARQ feedback performance is improved.

Figure 10:
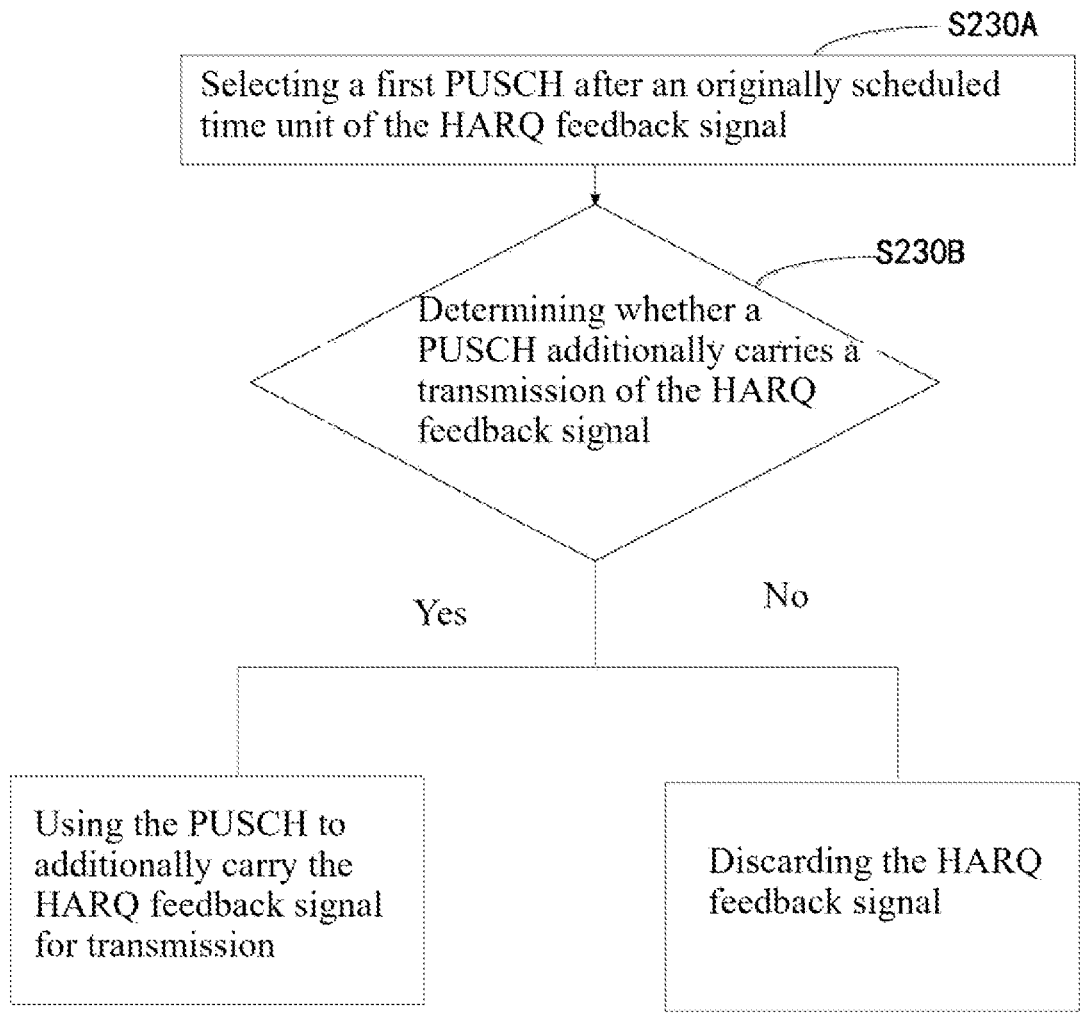
FIG. 10 is a schematic flowchart of operation S200 according to another embodiment of the present application.

Optionally, as shown in FIG. 10, determining whether the HARQ feedback signal satisfies the condition for postponing feedback in operation S200 includes:

Operation S230A: Selecting a first PUSCH after an originally scheduled time unit of the HARQ feedback signal.

Operation S230B: Determining whether a PUSCH additionally carries the HARQ feedback signal.

if yes, using the PUSCH to additionally carry the HARQ feedback signal for transmission, if not, discarding the HARQ feedback signal.

This embodiment is solution B. Specifically, in this embodiment, the UE feeds back the postponing HARQ feedback only on the first PUSCH after the HARQ feedback conflict occurs. If there are not enough resources on the PUSCH to carry the postponing HARQ feedback, the postponing HARQ-ACK feedback is discarded.

It should be noted that this solution can exist independently, or can be combined with solution A, that is, when there is no available PUCCH, consider whether the first PUSCH can be used to transmit postponing HARQ feedback.

According to the current agreement, if the UCI is multiplexed on the PUSCH for transmission, the higher layer (RRC) may configure the multiplexing parameters betaOffsetACK-Index1, betaOffsetACK-Index2, and betaOffsetACK-Index3 to the UE, respectively used for the UE to multiplex up to 2 bits, 2 bits to 11 bits, and HARQ feedback information exceeding 11 bits to be transmitted on the PUSCH. The beta-offset indicator in the DCI indicates which of the above-mentioned betaOffsetACK-Index is specifically used to the UE. See 3GPP 38.213 protocol for specific description. Therefore, whether the PUSCH can be used to transmit the postponing HARQ-ACK feedback can be determined according to whether the beta-offset is configured and the specific configured beta-offset index. Therefore, the PUSCH can be used to transmit postponing HARQ-ACK information when the following conditions are met:

The beta-offset indicator field is configured in the DCI format.

There is no multiplexed HARQ feedback transmission in the current PUSCH.

The number of bits corresponding to the beta-offset index indicated by the Beta-offset indicator field is not less than the sum of the number of postponing HARQ feedback information bits.

In addition, the base station may additionally configure a beta-offset indicator specially used to indicate that the postponing HARQ feedback is sent on the PUSCH. Because if a conflict occurs, the base station side can predict it. The base station may additionally configure the PUSCH indicated after the collision to transmit the postponing HARQ-ACK feedback. Therefore, a beta-offset parameter needs to be newly defined in the DCI format or high-layer parameters, which is specially used for the postponing HARQ-ACK feedback transmission on the PUSCH.

Figure 11:
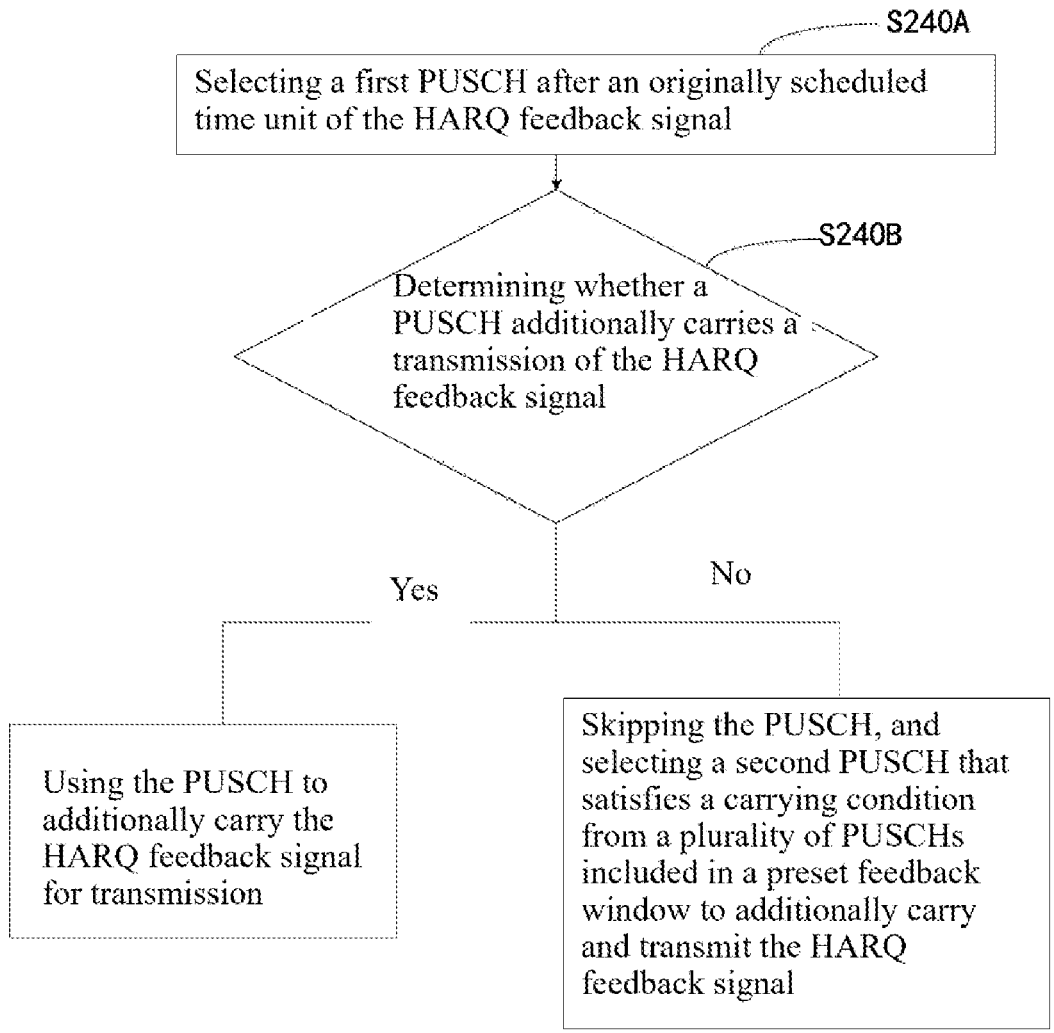
FIG. 11 is a schematic flowchart of operation S200 according to another embodiment of the present application.

Optionally, as shown in FIG. 11, the operation S200 of determining whether the HARQ feedback signal satisfies the condition for postponing feedback further comprises:

Operation S240A: Selecting a first PUSCH after an originally scheduled time unit of the HARQ feedback signal.

Operation S240B: Determining whether a PUSCH additionally carries a transmission of the HARQ feedback signal.

If yes, using the PUSCH to additionally carry the HARQ feedback signal.

If not, skipping the PUSCH, and selecting a second PUSCH that satisfies a carrying condition from a plurality of PUSCHs included in a preset feedback window to additionally carry and transmit the HARQ feedback signal.

This embodiment is solution D. Similar to solution C, if the first PUSCH does not meet the requirements of sending postponing HARQ feedback, skip the PUSCH, determine whether the next one meets the requirements, and so on, until an available PUSCH is selected. Refer to the satisfaction conditions set in solution B for the determining process and refer to the description in solution C for the definition and solution of the feedback window. It should be noted that this solution can exist independently or be combined with solution C. That is, when there is no available PUCCH in the feedback window, it is determined whether there is an available PUSCH to transmit the postponing HARQ feedback.

Optionally, after selecting the second PUSCH that satisfies the carrying condition in operation S240, the method further comprises:

If there is no second PUSCH satisfying the carrying condition, determining whether a cumulative value of free resources of any plurality of PUSCHs in the feedback window satisfies a need to additionally carry the HARQ feedback signal, and if yes, entering a feedback group transmission operation.

This embodiment is an extended solution of solution D, which is similar to the extended solution of solution C. The HARQ feedback is grouped first according to the service attributes. According to the preset priorities corresponding to the service attributes, the feedback groups are selected sequentially from high to low. Further, configure the qualified PUSCH within the feedback window for the feedback group to carry and transmit it until the PUSCH selection fails.

Determining the PUSCH is the same as the conditions set up in solution B, the feedback window is configured by the base station for signaling, and the specific definition is the same as that described in solution C.

Specifically, the HARQ feedback is first grouped according to service attributes, for example, the URLLC service field is of high priority, and the eMBB service field is of low priority.

After grouping, the feedback group with high priority is sent first. That is, it is first determined whether there is a qualified PUSCH to send a high-priority feedback group. For the determining method, refer to the conditions set up in solution B.

After the high-priority HARQ feedback determines the transmitted PUSCH, it is then determined whether there is a PUSCH that meets the requirements to send the low-priority HARQ feedback. If not, discard the feedback group, or directly discard the feedback group currently configuring the channel and the groups with a lower priority than the feedback group.

It should be noted that the PUSCH for sending low-priority groups cannot be earlier than the PUSCH for sending high-priority groups.

In addition, it can also be considered to use the applicable PUCCH to send HARQ feedback for high priority groups. Using PUSCH to send HARQ feedback of low priority groups, the conditions that need to be met are as follows:

The postponing HARQ feedbacks are first grouped according to the service attributes. For example, the URLLC service has a high priority, and the eMBB service has a low priority.

After grouping, send high-priority HARQ feedback first. That is, it is first determined whether there is a qualified PUCCH to send the high-priority HARQ. Refer to solution A for the determining method.

After the high-priority HARQ determines the PUCCH to be transmitted, it is determined whether there is a PUSCH that meets the requirements to send the low-priority HARQ. Refer to solution B for the determining method. If not, discard the HARQ of the group, or directly discard the HARQ feedback of the low-priority group.

It should be noted that the PUSCH for sending low-priority groups cannot be earlier than the PUCCH for sending high-priority groups.

Figure 12:
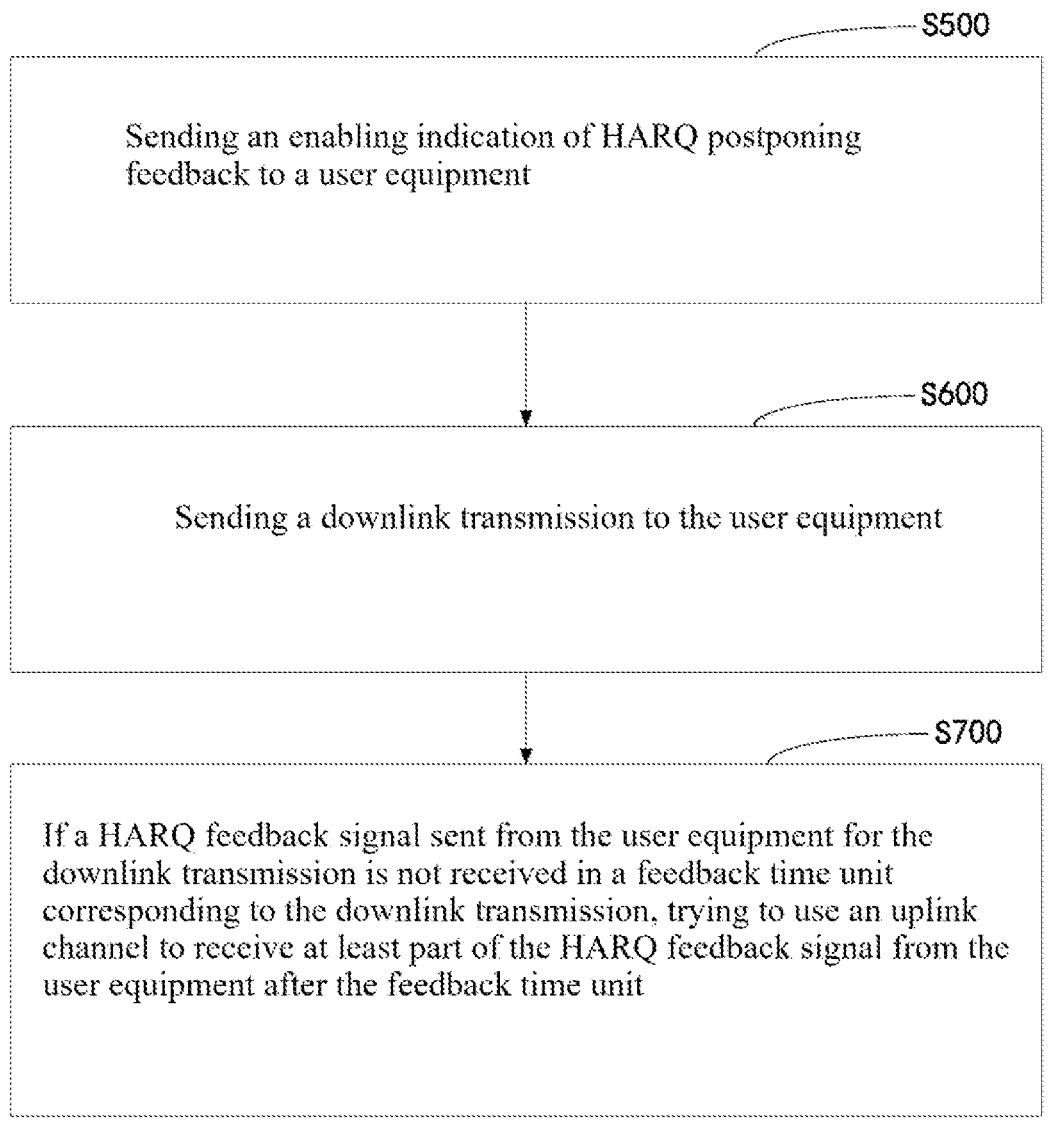
FIG. 12 is a schematic flowchart of a HARQ transmission enhancement method according to a second embodiment of the present application.

As shown in FIG. 12, a second embodiment of the present application further provides a HARQ transmission enhancement method, including:

Operation S500: Sending an enabling indication of postponing HARQ feedback to a user equipment.

Operation S600: Sending a downlink transmission to the user equipment.

Operation S700: If a HARQ feedback signal sent from the user equipment for the downlink transmission is not received in a feedback time unit corresponding to the downlink transmission, trying to use an uplink channel to receive at least a part of the HARQ feedback signal from the user equipment after the feedback time unit.

Optionally, a downlink indication comprises a multiplexing indication comprising a multiplexing parameter, and the multiplexing parameter is used to indicate a number of PUSCH multiplexing bytes allocated to the user equipment.

Figure 13:
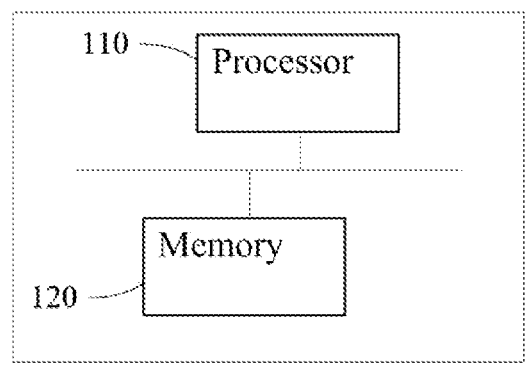
FIG. 13 is a schematic structural diagram of a communication device according to a first embodiment of the present application.

Referring to FIG. 13, the present application further provides a communication device including a processor 110 and a memory 120.

The processor 110 controls the operation of the communication device. The processor 110 may also be referred to as a CPU (Central Processing Unit). The processor 110 may be an integrated circuit chip with signal processing capabilities. The processor 110 can also be a general-purpose processor, a digital signal processor (DSP), an application-specific integrated circuit (ASIC), a field-programmable gate array (FPGA) or other programmable logic devices, discrete gate or transistor logic devices, discrete hardware components. The general purpose processor may be a microprocessor or the processor 110 may be any conventional processor or the like.

The memory 120 stores instructions and data required for the processor 110 to work.

The processor 110 is configured to execute instructions to implement the method provided in a first embodiment of the present application.

Figure 14:
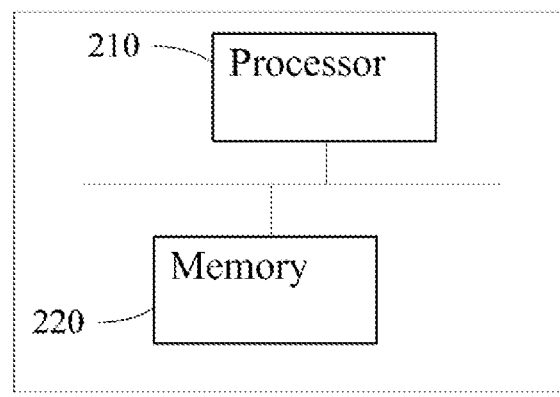
FIG. 14 is a schematic structural diagram of a communication device according to a second embodiment of the present application.

As shown in FIG. 14, a second embodiment of the communication device of the present application includes a processor 210 and a memory 220.

The processor 210 controls the operation of the communication device. The processor 210 may also be referred to as a CPU (Central Processing Unit). The processor 210 may be an integrated circuit chip with signal processing capabilities. The processor 210 can also be a general-purpose processor, a digital signal processor (DSP), an application-specific integrated circuit (ASIC), a field-programmable gate array (FPGA) or other programmable logic devices, discrete gate or transistor logic devices, discrete hardware components. The general purpose processor may be a microprocessor or the processor 210 may be any conventional processor or the like.

The memory 220 stores instructions and data required for the processor 210 to work.

The processor 210 is configured to execute instructions to implement the method provided in the second embodiment of the present application.

Figure 15:
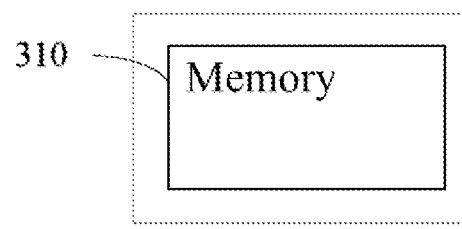
FIG. 15 is a schematic structural diagram of a readable storage medium according to an embodiment of the present application.

As shown in FIG. 15, an embodiment of a readable storage medium of the present application includes a memory 310. The memory 310 stores instructions. When the instruction is executed, the method provided by any embodiment and possible combination of the communication method of the present application is implemented.

The memory 310 may include a read-only memory (ROM), a random access memory (RAM), a flash memory, a hard disk, an optical disk, and the like.

In the several embodiments provided in the present application, it should be understood that the disclosed system, device, and method can be implemented in other ways. For example, the device embodiments described above are illustrative only. For example, the division of units is only a logical function division, and there may be another division method in actual implementation. For example, several units or components may be combined or may be integrated into another system, or some features may be omitted, or not implemented. In another point, the mutual coupling or direct coupling or communication connection shown or discussed may be through some interfaces, and the indirect coupling or communication connection of devices or units may be in electrical, mechanical or other forms.

The units described as separate components may or may not be physically separated, and the components displayed as units may or may not be physical units, that is, they may be located in one place, or may be distributed to multiple network units. Part or all of the units can be selected according to actual needs to achieve the purpose of the solution of this embodiment.

In addition, each functional unit in each embodiment of the present application may be integrated into one processing unit, each unit may exist separately physically, or two or more units may be integrated into one unit. The above-mentioned integrated units can be implemented in the form of hardware or in the form of software functional units.

If the integrated unit is realized in the form of a software function unit and sold or used as an independent product, it can be stored in a computer-readable storage medium. Based on this understanding, the technical solution of the present application is essentially or the part that contributes to the prior art or all or part of the technical solution can be embodied in the form of a software product, and the computer software product is stored in a storage medium, including several instructions to make a computer device (which may be a personal computer, a server, or a network device, etc.) or a processor execute all or part of the steps of the methods described in the various embodiments of the present application. The aforementioned storage medium includes U disk, mobile hard disk, read-only memory (ROM), random access memory (RAM), magnetic disk or optical disk and other media that can store program codes.

The above are only the implementation manners of the present application and are not intended to limit the patent scope of the present application. Any equivalent structure or equivalent process transformation made by using the contents of the specification and drawings of the present application, or directly or indirectly used in other related technical fields, is also included in the scope of patent protection of the present application.

What is claimed is:

1. A hybrid automatic repeat request (HARQ) transmission enhancement method, comprising:
   receiving a downlink transmission sent by a base station;
   when an abnormal process is needed in sending of a HARQ feedback signal for the downlink transmission, determining whether the HARQ feedback signal satisfies a condition for postponing feedback; and
   if yes, selecting a physical uplink shared channel (PUSCH) after an originally scheduled sending time unit of the HARQ feedback signal to transmit at least a part of the HARQ feedback signal;
   wherein before determining whether the HARQ feedback signal satisfies a condition for postponing feedback, the method further comprises:
   receiving an enabling indication of a postponing HARQ feedback from the base station;
   wherein the enabling indication of the postponing HARQ feedback is included in a radio resource control (RRC) signaling or a downlink control information (DCI).

2. The HARQ transmission enhancement method according to claim 1, wherein a physical downlink shared channel (PDSCH) based on a semi-persistent scheduling (SPS) carries the downlink transmission.

3. The HARQ transmission enhancement method according to claim 1, wherein the condition for postponing feedback comprises:
   an aggregation factor corresponding to the downlink transmission is greater than a first threshold.

4. The HARQ transmission enhancement method according to claim 1, wherein the condition for postponing feedback comprises:
   an aggregation factor corresponding to the downlink transmission is less than a second threshold.

5. The HARQ transmission enhancement method according to claim 1, further comprising:
   if the HARQ feedback signal does not satisfy the condition for postponing feedback, abandon sending the HARQ feedback signal.

6. The HARQ transmission enhancement method according to claim 1, wherein determining whether the HARQ feedback signal satisfies the condition for postponing feedback comprises:
   selecting a first PUSCH after an originally scheduled time unit of the HARQ feedback signal, and determining whether a PUSCH additionally carries the HARQ feedback signal;
   if yes, using the PUSCH to additionally carry the HARQ feedback signal for transmission, if not, discarding the HARQ feedback signal.

7. The HARQ transmission enhancement method according to claim 6, wherein whether the PUSCH additionally carries the HARQ feedback signal comprises:
   determining whether a value of a multiplexing parameter is greater than an amount of information of the HARQ feedback signal according to a preset multiplexing parameter, wherein the multiplexing parameter is configured by the base station in advance;
   if yes, using the PUSCH to carry the HARQ feedback signal for transmission;
   if not, discarding the HARQ feedback signal.

8. The HARQ transmission enhancement method according to claim 1, wherein determining whether the HARQ feedback signal satisfies the condition for postponing feedback further comprises:
   selecting a first PUSCH after an originally scheduled time unit of the HARQ feedback signal, and determining whether a PUSCH additionally carries a transmission of the HARQ feedback signal;
   if yes, using the PUSCH to additionally carry the HARQ feedback signal;

if not, skipping the PUSCH, and selecting a second PUSCH that satisfies a carrying condition from a plurality of PUSCHs included in a preset feedback window to additionally carry and transmit the HARQ feedback signal.

9. The HARQ transmission enhancement method according to claim 8, wherein after selecting the second PUSCH that satisfies the carrying condition, the method further comprises:
if there is no second PUSCH satisfying the carrying condition, determining whether a cumulative value of free resources of any plurality of PUSCHs in the feedback window satisfies a need to additionally carry the HARQ feedback signal, and if yes, entering a feedback group transmission operation.

10. The HARQ transmission enhancement method according to claim 8, wherein after selecting the second PUSCH that satisfies the carrying condition, the method further comprises:
if there is no second PUSCH satisfying the carrying condition, determining, whether there is any PUSCH in the feedback window that carries part of the HARQ feedback signal, if yes, entering a feedback group transmission operation.

11. The HARQ transmission enhancement method according to claim 9, wherein the feedback group transmission operation comprises:
grouping HARQ feedback signals according to preset service attributes to obtain a plurality of feedback groups;
selecting the feedback groups in sequence from high to low according to preset priorities corresponding to the service attributes and configuring the feedback groups with a qualified PUSCH within the feedback window to carry and transmit the qualified PUSCH until a PUSCH selection fails.

12. The HARQ transmission enhancement method according to claim 11, wherein after the PUSCH selection fails, the method further comprises:
discarding a current feedback group and a feedback group whose priority order is lower than the current feedback group.

13. A HARQ transmission enhancement method, comprising:
sending an enabling indication of postponing HARQ feedback to a user equipment;
sending a downlink transmission to the user equipment;
if a HARQ feedback signal sent from the user equipment for the downlink transmission is not received in a feedback time unit corresponding to the downlink transmission, trying to use a physical uplink shared channel (PUSCH) to receive at least a part of the HARQ feedback signal from the user equipment after the feedback time unit;
wherein a downlink indication comprises a multiplexing indication comprising a multiplexing parameter, and the multiplexing parameter is used to indicate a number of PUSCH multiplexing bytes allocated to the user equipment.

14. A communication device, comprising:
a processor; and
a communication circuit, wherein the processor is connected to the communication circuit;
wherein the processor is configured to:
receive a downlink transmission sent by a base station;
when an abnormal process is needed in sending of a HARQ feedback signal for the downlink transmission, determine whether the HARQ feedback signal satisfies a condition for postponing feedback; and
if yes, select a physical uplink shared channel (PUSCH) after an originally scheduled sending time unit of the HARQ feedback signal to transmit at least a part of the HARQ feedback signal;
wherein before the processor determines whether the HARQ feedback signal satisfies a condition for postponing feedback, the processor is configured to receive an enabling indication of a postponing HARQ feedback from the base station, wherein the enabling indication of the postponing HARQ feedback is included in a radio resource control (RRC) signaling or a downlink control information (DCI).

15. The communication device according to claim 14, wherein a physical downlink shared channel (PDSCH) based on a semi-persistent scheduling (SPS) carries the downlink transmission.

\* \* \* \* \*